April 9, 1940.    J. E. HALL    2,196,794
STEM JAMMED WEDGE VALVE
Filed May 19, 1939    2 Sheets-Sheet 2
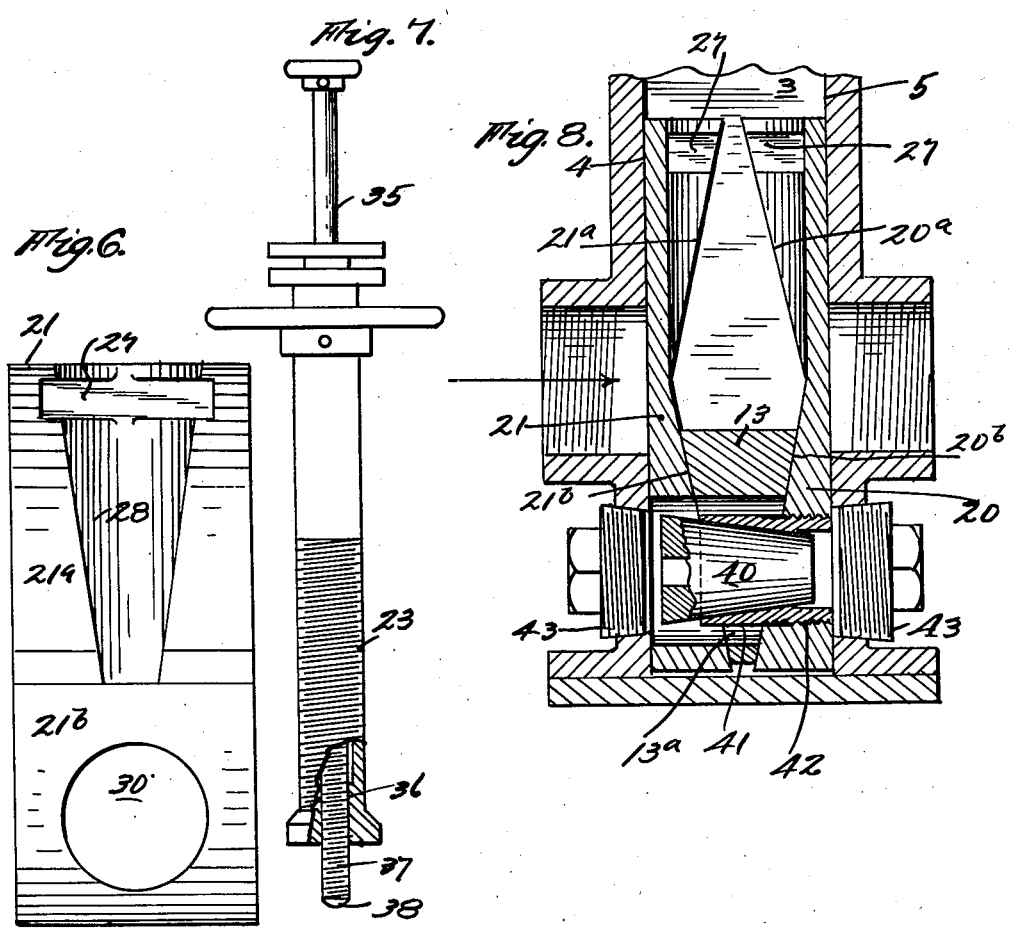
Inventor,
Jesse E. Hall;
By his Atty,
Frederick E. Maynard.

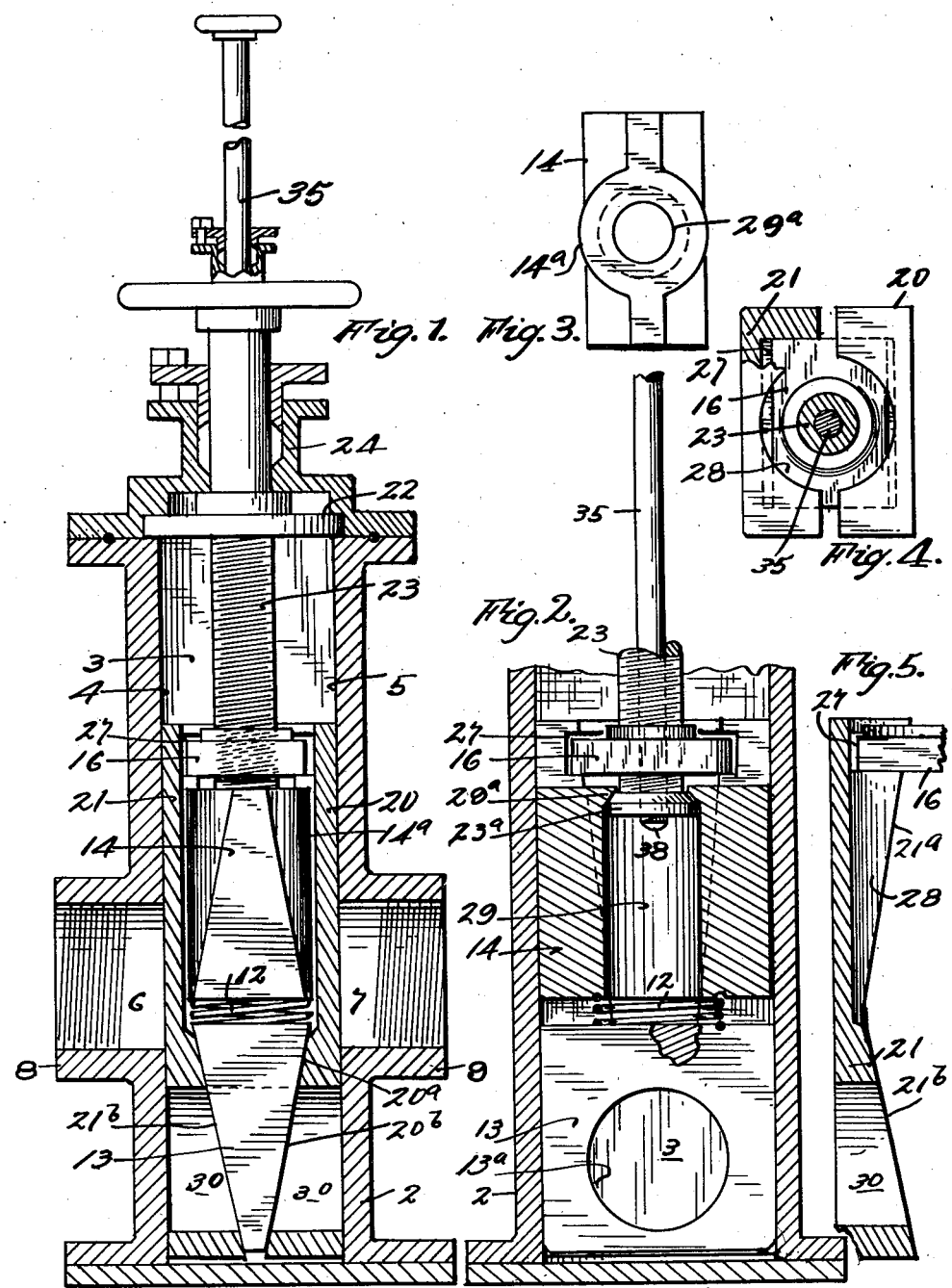

Patented Apr. 9, 1940

2,196,794

UNITED STATES PATENT OFFICE 2,196,794

STEM JAMMED WEDGE VALVE

Jesse E. Hall, Los Angeles, Calif.

Application May 19, 1939, Serial No. 274,610

17 Claims. (Cl. 251—68)

This invention is a wedge-type, two plate gate or throttle valve.

Late U. S. patents typifying wedge class valves with two closure and opening plates are notably Law, No. 1,734,866, and Law, No. 1,875,035, and Laurent, No. 2,002,780, the latter having two side plates directly wedging one on the other. It will be readily seen that each of these patents discloses—a shell or body with a valve chamber having lateral communicating inlet and outlet passages and that each patent has a split or two-part valve (that is a closure device) in the chamber movable to open or closed positions. Laurent shows wedge means built up on or added as integral parts to the contiguous inner faces of his "blocks 41 and 42" to expand the blocks or two part valve within the chamber to tighten the valve at each extreme of movement. A distinction between the art of Laurent and that of Law's patents is that the latter each have a wedge mechanism associated with or additional to the two-part valve to expand said valve within the chamber or shell. That is, the wedge mechanisms of the Law patents are not wholly integrally incorporated with the "blocks" as in Laurent, but each has a stem which has a threaded wedge device thereon, hence, additional to complementary wedge faces on the apposed parts of the split valve.

Therefore no claim is here made merely to a split valve gate or closure and additional wedge mechanisms to jam the two valve pieces at each extreme of their axial shift in a shell or body.

It is an object of this invention to provide a double-acting and double side thrust, device including a pair of constantly independent wedges designed, constructed, arranged and adapted to constantly and concurrently exert a lateral seating pressure on side valve plates both during an operational shift of the wedges and their associated plates and during all time of rest of the wedges and the plates, in either port open or port closed positions.

Another object of the invention is to provide valve plates constructed and arranged and adapted to shift the independent wedges of the device all in unison and without chatter or relative looseness of any part of the dual plate and the dual wedge assembly, and still provide for a controlled, relative motion of the dual plates and either of the wedges while the other wedge is arrested for an expansive function on the two plates, which have a limited degree of relative lateral plate as to the valve axis.

It is a notable and clearly distinctive object, over any art known to the inventor here, to provide a dual plate and dual wedge organization functioning without self-engagement with any part of the stationary shell features per se.

More directly, an object is to provide a dual plate, ported throttle carrying dual, reverse-pointing, relatively independent wedges, with positive and concurrent lateral plate thrusting function and with or without an automatic axial shift tendency effective on the wedges and therethrough onto the plates of the throttle to constantly press them to their shell wall seats, with sliding capacity.

Also, an object is to provide a stem-shifted, dual plate throttle with independent spreader wedges, and the stem of which is the direct control means for both shift of the plates and the independent wedges, and to provide for the arrest of the wedges singly on opposite strokes of the plates (in unison) so that one wedge will react to jam the plates to seats on either shift extreme, while the other wedge is free to go axially with the pair of plates.

And, an object is to provide a dual stem device whereby first to shift the throttle plates together to extremes in either way, extremities determined by the stem alone in direct action on the wedges, and to enable the jamming or seating of the dual plates at any degree of opening of the throttle port as to the shell ports; it being understood that the dual plates have opposite conduit ports and opposite blind portions to close the shell ports.

The invention consists in certain improvements in this art as set forth in the ensuing disclosure and having, with the above, additional objects and advantages as hereinafter developed, and whose constructions, combinations, and details of means, and the manner of operation will be made manifest in the description of the herewith illustrative embodiments; it being understood that modifications, variations and adaptations may be resorted to within the spirit, scope and principle of the invention as it is more directly claimed.

Figure 1 is an axial plane section of the valve structure on the stem and conduit axes of the structure. Figure 2 is a trans-conduit, stem-axis section of the lower portion of the valve; which is closed in both Figs. 1 and 2.

Figure 3 is a top plan of the upper, closed-valve jamming wedge of the dual wedge device. Figure 4 is a broken top plan of the opposed dual throttle plates showing a coupling nut in its nest in the two plates. Figure 5 is an axial section, endwise, of one of the two, duplicate valve plates, with a relative portion or end of the coupling nut. Figure 6 is an inside, wedge-seat face view of one of the plates. Figure 7 is a somewhat sectioned, elevation of the dual stem unit for shifting the plates and for jamming the plates to wall seats at any opening degree, or for supplemental wedge pressure when the plates are in full open position.

Figure 8 is a two-axis sectional view of the lower part of the valve (closed) showing a flow bean device interchangeably mounted in one of the shiftable plates.

The valve includes a shell 2 of any suitable material and size, and has an elongate chamber 3 of generally oblong cross-section and presents smooth, plane opposite bearing faces 4 and 5 having co-axial, conduit ports 6 and 7 through lateral bosses 8—9.

The shell is suitably closed at its bottom and working on the axis of the chamber 3 is a wedge device consisting of oppositely converging, butt-juxtaposed, wholly independent, substantial, preferably like-angle wedge members 13 and 14, hereinafter called "wedges." These have their inclined faces disposed toward relative shell faces 4—5; that is, transverse the axis of the flow ports 6—7.

Fig. 2 shows the upper end of the wedge 14 disposed below a transverse block or nut 16 in a manner to be entirely clear thereof for desired relative movement; the wedges being shown in this view as extending substantially from side to side in the shell.

On each side of the pair of wedges presenting the effective, inclined faces of the wedges there is disclosed a relative cheek or valve throttle plate, one on the right side as 20 and one on the left as 21. The inner faces of the plates have upwardly and inwardly converging areas 20a and 21a snugly fitting the upper wedge 14, and the plates have downwardly and inwardly converging areas 20b and 21b closely fitting the lower wedge 13. The wedges 13 and 14 are suitably shorter than the valve plates 20 and 21 so that they cannot engage any parts of the shell or portions fixed thereon with an arresting result on the wedges, and in just the same extent the plates 20 and 21 are of insufficient length at either end to be arrested by shell parts. It will thus be clear that the pair of wedges are entirely confined in and are carried by the plates when these are moved in either direction in the chamber 3 whilst slidably supported on their contiguous faces 4—5 of the shell.

It is a particular feature of this invention that means are provided which have the automatic and constant function of thrusting the wedges in opposite directions each with a common resultant of force pressing the two side valve plates 20—21 firmly but slidably to their wall seats in the shell. Such a means here consists of a suitable axially reactive spring 12 engaging the near butts of the wedges. Therefore, all undesired play is kept out of the enclosed wedges and also of their enclosing valve plates 20—21; which several wedges and plates go to make up a unitary, slidable, snug fitting insides for the valve shell.

Suitably operated means are provided to effect the concurrent up shift or down shift of the plates 20—21 on their wall seats in the shell. A stem bearing 22 is fixed in the upper end of the shell and forms a thrust stop for an operating stem screw 23 which is rotatively packed in a suitable gland box 24 on the upper end of the shell 2. The lower threaded portion of the stem screw engages the transverse nut 16 and by turning the stem 23 in one direction the nut 16 will move upward, and a reverse rotation will force the nut downward. The nut 16 is suitably nested at its ends in the opposed, upper ends of the plates 20—21 so that it will actuate, that is axially shift, these when the stem screw is rotated.

In the present case the nut ends mesh or nest into complementary, inner face pockets 27 just below and across the tops of the plates 20—21 to a sufficient degree to prevent undue end slip of the inserted nut; the pockets 27 being deep enough to permit a desired degree of axial shift of the plates as to the stem mounted nut 16, and also to allow the plates to be sufficiently collapsed as to facilitate their endwise insertion (with the confined wedges) into the shell. The inner faces of the plates 20—21 are axially channeled at 28 to provide clearance for the screw 23 as the plates are shifted and to provide clearance of a cylindrical, concentric boss or body part 14a of the upper wedge 14. Clearance for the stem screw is provided for in the full length of the wedge 14 by an axial bore 29 therein.

This bore has a contracted upper end at a crown bead 29a which has the purpose of moving down into stopping engagement with a complementary shoulder 23a provided on the lower end portion of the screw 23. When the screw 23 is so turned as to cause the plates 20—21 to shift down in the shell and move a flow port 30 out of register with the conduit ports 6—7 then the wedge crown bead 29a will be intercepted by the non-shifting though rotary shoulder 23a, and the descent of the wedge 14 will be positively halted with the result that some further permissible descent of the nut 16 and the two valve plates 20—21 causes the plates to be positively jammed with added wedge pressure (from wedge 14) outward throughout their rigid length against their respective wall seats with their upper imperforate or blind portions covering the shell ports 6—7, without either the plates or the wedges abutting any stop part of or on the shell faces or ends. The wedges are at this position still under axial pressure of the spring 12 which is effective in firmly pressing the lower wedge 13 down to a solid seat on the finally stopped plates now jammed on the opposite shell walls.

The lower wedge 13 has a flow port 13a in constant register with the ports 30 of the plates 20—21. A reverse or say left hand turn of the screw 23 will cause the nut 16 to move upward on the screw and to draw along with itself the two plates so that these are first pulled up slightly from the arrested wedge 14, or at least the pressure on the wedge is so diminished that the wedge 14 and the plates will lift from the stem foot shoulder 23a; this up motion of the wedge 14 being aided by the spring 12. The lower wedge 13 at once moves upwardly with the carrier plates 20—21 and will continue up with the plates until they are stopped at any degree of opening of ports 6—7 by cessation of stem screw rotation, or until the wedge 13 is positively stopped in ascent by its direct engagement with the superjacent lower end of the screw 23, at which time the several flow ports of the shell and the movable plate and wedge assembly will be in full opening register. Any further and small degree of rotation of the screw 23 pulls upward on the valve plates 20—21 with a resultant lateral thrust reaction from the arrested wedge 13, and the plates for their full length are jammed to the shell walls. It will be noticed, therefore, that all motions of the plates and dual wedges are controlled and effected by the screw 23 and its nut 16 coupling the plates, and that stopping of the plate and wedge assembly is controlled and effected by the screw 23 in engaging the wedges separately at end of opposite strokes of the plates: the upper wedge 14 jams the valve closed and the lower jams the valve opened.

It is desirable to jam the plates at their lower ends in closed position of the valve and at locations where the stem screw 23 is not available for that function. Therefore, a supplemental stem 35 is turnably threaded axially in the main stem 23 this having threads 36 for threads 37 of the stem 35. The upper end of the stem 35 projects high enough above the screw 23 to allow the toe 38, Fig. 7 to be run down so as to engage and stop the lower wedge 13 at closed or any opening relation of the wedge port 13a with the effect of firmly jamming the plates 20—21 laterally to the shell.

For the purpose of variously regulating the full diameter opening of the valve structure a so-called "flow-bean" element is provided. This is in the form of a conical plug 40 of less length than the thickness of the plate assembly and being snugly seated in a bushing 41 screwed at 42 into and projecting inwardly from plate 20, for instance, into the port 13a of wedge 13. When the valve is closed the bean plug 40 alines with removable plugs 43 screwed into the opposite lower portions of the valve seat walls of the shell. By removing the screw plugs 43 the bean plug 40 can be driven into or from its seat bushing 41; which if desired may be formed integrally with its valve plate.

It will be seen that when the valve is closed both its upper and its lower ends are each positively jammed first by the upper wedge 14 and then by the manually, later run down supplemental screw stem 35. The shell plugs 43 can now be removed without leak of high pressure fluid which may have been trapped in the shell chamber 3.

As to patentable matter disclosed herein and not here claimed, reference is made to my copending application Ser. No. 172,712, filed November 1, 1937. Particularly as to the lower wedge element 13 having a through, conduit forming port in register with the conduit holes 30 in the valve plates 20—21; which wedge and plates have tight face to face sealing contact in the same manner as do the plates on their shell wall seats.

In the absence of description of kinds of material employed it is understood that materials best adapted for parts functions are intended to be used, as an expert in the art may determine.

What is claimed is:

1. A wedge valve of the class described, including a pair of opposite, axially shiftable plates with blind and ported portions, a shell with alined side ports to be covered or uncovered by said plates, a nut by which said plates are cross coupled for shift therewith and thereby, a rotary stem screw for and by which the nut is actuated, and a pair of relatively independently movable, butt-juxtaposed wedges fitting opposite complementary faces of the plates and both carried by said plates in each direction of movement of the plates as a unitary assembly, and said screw having parts to stop each of the wedges during shift of the plates.

2. The valve of claim 1, said wedges operative separately and individually and independently of each other to jam the plates against opposite shell walls in either port open or port closed position.

3. The valve of claim 1, and the said stop parts acting respectively on reverse strokes of the plates.

4. A wedge valve including a shell with opposite side walls having alined ports, valve plates fitting slidably on the walls and having blind and ported parts to open and close the valve, butt-juxtaposed, independent wedges fitting between and shiftable in each direction with and by the plates and each independently axially movable as to the other, and a shell mounted screw having a nut coupling and by which the plates are concurrently axially shifted.

5. The valve of claim 4, and the wedges being axially movable as to the plates to effect lateral spread of the plates.

6. The wedge of claim 4, and said screw cooperative with the said wedges to arrest them in given positions and whereby to cause the plates to be jammed against the said walls.

7. The valve of claim 4, and said screw being directly cooperative with the wedges to thereby thrust the plates to seats on said walls.

8. The valve of claim 4, and said screw being directly cooperative with the wedges to thereby thrust the plates to seats on said walls in either open or closed valve position.

9. The valve of claim 4, and automatic play take up means for the assembly of plates and wedges.

10. A wedge valve including a shell having opposite walls with flow ports, valve plates fitting slidably on the said walls and having blind and ported portions to open and close the shell ports, butt-juxtaposed, independent wedges fitting between and shiftable in each direction by and with the plates and independently movable as to each other, and a screw turnably mounted in the shell and having a nut on which the plates are mounted for axial and lateral motions by which the plates are axially shifted in the shell and the screw being engageable with one of the wedges at limit of one stroke and with the other wedge at limit of the opposite stroke.

11. The valve of claim 10, and the plates being thrust to seats on the walls after either wedge is arrested by the screw.

12. The valve of claim 10, and means for axial reaction on the wedges to take up lost motion or play between the plates and the wedges in the shell so that the assembly or insides are kept snug.

13. The valve of claim 10, and stem set means operative on one of the wedges to jam the plates to the walls at any position of the valve plates in their stroke independently of screw stopping function.

14. A wedge valve having a shell provided with opposite, ported walls, a pair of independent, ported, port closing and opening plates slidable on said walls, a pair of coaxial, reversed wedges confined and fitting between the plates and having axial movement relative thereto, a two-part stem including one threaded part turnable in the shell and having a double-acting nut coupling and shifting the plates concurrently in either direction, and operative to arrest the wedges singly on opposite strokes of the nut, and one part of the stem operative on one of the wedges to jam the plates at any position in their strokes.

15. The valve of claim 1, and automatic means acting constantly to thrust the plates slidably to their wall seats.

16. The valve of claim 1, and means acting constantly on the wedges with axial effort to take up play of the plates and the wedges in the shell.

17. In a wedge-type throttle valve structure, a shell with conduit ports, perforate plates operative in the shell to close or open the ports, a stem coupled to the plates to shift them as one in two directions, independent wedges each acting laterally to spread both plates, one on one plate stroke and the other on the opposite stroke, means to effect such wedge action on such strokes, and means to effect the setting action of the idle or non-active wedge so that it will coact with the normally stroke set wedge; whereby the two wedges are concurrently acting on their respective ends of the pair of plates in the closed position of the valve.

JESSE E. HALL.